United States Patent [19]
Subrahmanyam

[11] Patent Number: 5,732,214
[45] Date of Patent: Mar. 24, 1998

[54] SYSTEM FOR UNIVERSAL ARCHIVAL SERVICE WHERE TRANSFER IS INITIATED BY USER OR SERVICE AND STORING INFORMATION AT MULTIPLE LOCATIONS FOR USER SELECTED DEGREE OF CONFIDENCE

[75] Inventor: Pasupathi Ananta Subrahmanyam, Freehold, N.J.

[73] Assignee: Lucent Technologies, Inc., Murray Hill, N.J.

[21] Appl. No.: 395,560

[22] Filed: Feb. 28, 1995

[51] Int. Cl.[6] .................................................. G06F 13/00
[52] U.S. Cl. ................... 395/200.12; 395/200.09
[58] Field of Search ............. 358/402; 364/242.94, 364/284.4; 380/2, 25; 395/280, 600, 650, 700, 800

[56] References Cited

U.S. PATENT DOCUMENTS

| | | | |
|---|---|---|---|
| 4,292,669 | 9/1981 | Wollum et al. | 395/884 |
| 5,005,122 | 4/1991 | Griffin et al. | 395/200.01 |
| 5,036,518 | 7/1991 | Tseung | 371/32 |
| 5,113,499 | 5/1992 | Ankney et al. | 340/825.34 |
| 5,121,495 | 6/1992 | Nemes | 395/603 |
| 5,133,065 | 7/1992 | Cheffetz et al. | 395/575 |
| 5,136,706 | 8/1992 | Courts | 395/622 |
| 5,212,772 | 5/1993 | Masters | 395/182.18 |
| 5,214,768 | 5/1993 | Martin et al. | 395/425 |
| 5,214,781 | 5/1993 | Miki et al. | 395/619 |
| 5,237,460 | 8/1993 | Miller et al. | 360/8 |
| 5,276,735 | 1/1994 | Boebert et al. | 380/21 |
| 5,357,614 | 10/1994 | Pattisam et al. | 395/250 |
| 5,414,817 | 5/1995 | Ezzet et al. | 395/275 |
| 5,426,427 | 6/1995 | Chinnock et al. | 340/827 |
| 5,446,740 | 8/1995 | Yien et al. | 370/110.1 |
| 5,495,607 | 2/1996 | Pisello et al. | 395/600 |
| 5,515,502 | 5/1996 | Wood | 395/182.13 |
| 5,544,229 | 8/1996 | Creswell et al. | 379/67 |
| 5,574,906 | 11/1996 | Morris | 395/601 |
| 5,581,606 | 12/1996 | Gineys | 378/88 |

FOREIGN PATENT DOCUMENTS 2 595 487  3/1986  France .
2 646 539  4/1989  France .

*Primary Examiner*—Thomas C. Lee
*Assistant Examiner*—Anderson I. Chen

[57] ABSTRACT

A method and system for information archiving on a network that is universally accessible to users. A stationary or mobile user may archive information on demand. A hook up into the network is established via a communication medium, and an initial protocol accesses the archiving service and communicates details of what is to be archived. The communication medium is then used to transmit and store the information in a specified fashion on the network, to be retrieved at a future time. The hook up may be initiated either by the user or by the network.

22 Claims, 7 Drawing Sheets

SYSTEM FOR UNIVERSAL ARCHIVAL SERVICE WHERE TRANSFER IS INITIATED BY USER OR SERVICE AND STORING INFORMATION AT MULTIPLE LOCATIONS FOR USER SELECTED DEGREE OF CONFIDENCE

TECHNICAL FIELD

The present invention relates generally to information storage, and more particularly, to a method and system for archiving information on a communications network.

BACKGROUND OF THE INVENTION

The need to archive information is fundamental and essential to any information processing system. With traditional large scale computing machines archival services were provided by the computer center. In some case, "off site" storage was provided to guard against physical destruction on site. Presently, such services are rarely provided, and further, with the prevalence of personal machines, such traditional methods generally are not applicable to current archiving needs.

That is, outside a mainframe environment them are currently no convenient archival means that typically come with some type of computer center related centralized archival support. It may be understood that all currently advertised and proposed services for the present and near future, including those publicly associated with the "information superhighway" (e.g., Interactive television etc.), use a network to distribute information that is already archived; these services are not intended to provide an archival service for the end user. In the world of desktop personal computers (PCs), notebook computers, and personal digital assistants, archiving is a particular nuisance that each user has to perform individually, and archival services are either unavailable, or inconvenient. As a result individual users rarely archive information. Some related reasons and justifications why individual users overlook archiving include, for example: that archiving is ancillary to the primary purpose for which a user employs an information processing device and thus requires "better spent" time not only for implementing and maintaining an archive but also for learning and ascertaining the best archiving means; that primary storage media are sufficiently reliable; and therefore, assuming the latter and former assumptions are generally true, that archiving is generally not worth the effort and time investment. Most people also confront the inevitable, and often costly, consequences of the risk associated with foregoing archiving, i.e., (after the disk has crashed, or after a file has been deleted either accidentally or intentionally by an inadequate archival mechanism).

Nevertheless, despite such information losses and subsequent resolve to effect archiving, being organized about archiving is still difficult. Anyone who has edited a text or a program or an image/music file usually has multiple versions of the underlying information; these are typically scattered over several floppies, and perhaps hard disks and/or other archival devices. These devices tend to rapidly age and become technologically obsolete; for example, it is not possible even today to read some disks (e.g., low density floppies) that were written as recently as 2-3 years ago. To keep numerous floppies coherently accessible is itself an arduous task; to keep them dust-free or prevent them from being damaged by magnetic fields (TVs, pin up magnets, etc.), and other forces is practically impossible, especially for a typical user at home.

There remains, therefore, a need for further improvements in information archiving, and particularly, a need for improved archiving that may be readily employed and accessed by individual users in the home, as well as mobile users and business locations.

SUMMARY OF THE INVENTION

The present invention overcomes the above, and other, limitations by providing a network-based method and system for information archiving. The method of archiving information on a network includes the steps of: establishing a connection between the network and a user premises, the network being universally accessible with respect to a plurality of user premises; transmitting the information from the user premises to the network; and storing the information on the network. Establishing the connection may be initiated either by the user or by the network.

A system incorporating the method includes a communication link that is selectively enabled to establish a connection between user equipment and a network, the communication link including at least one access mode and providing for universal access of the network with respect to a plurality of users; and an archival node associated with the network, the archival node adapted to store information transmitted from the user equipment to the network over the communication link. An access mode may, for example, include any of the following means: a regular phone line with a modem; a television "set-top" box that embodies such capabilities; high-speed connections into either the network, or wireless modes of accessing the network. The archiving node may also include storage media to store user/customer profiles containing information such as preferred formats, protocols, and time or frequency for network initiated archiving. In addition, the archiving node may include file servers for effecting processing, such as file conversion or compression, either before archival storage or before transmitting a retrieved file to a user.

BRIEF DESCRIPTION OF THE DRAWINGS

The invention will be described in greater detail below by way of reference to the accompanying drawings, wherein.

DETAILED DESCRIPTION OF THE PREFERRED EMBODIMENT

Figure 1:
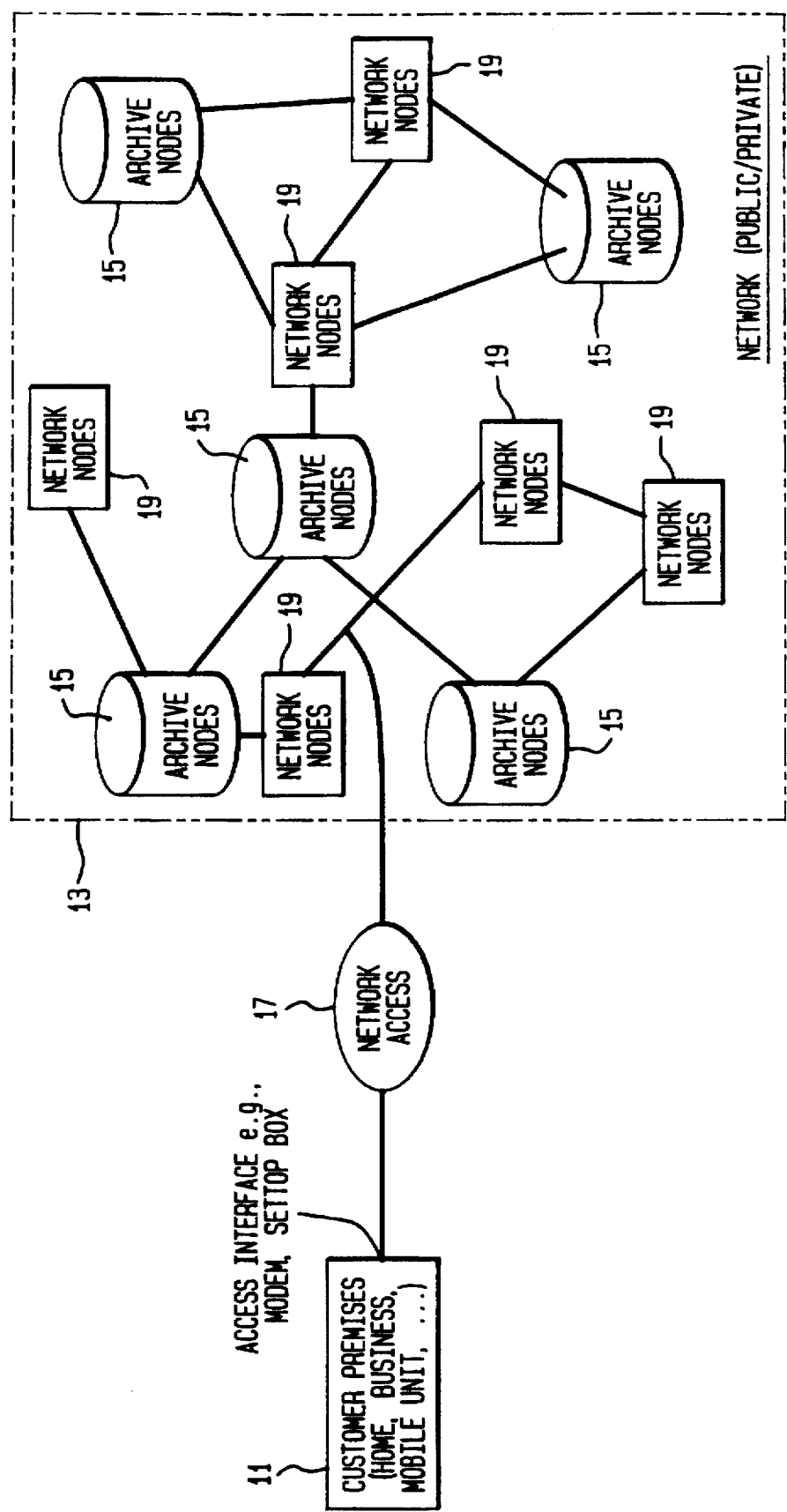
FIG. 1 shows, in simplified form, an exemplary generalized network embodying the principles of the invention.

Referring to FIG. 1, an embodiment of the present invention for a network-based archival method and system includes a customer premises 11 and a private or public network 13, which includes network nodes 19 and archiving nodes 15. A customer premises 11 is generally any location containing customer (user or subscriber) information processing equipment and may be situated, for example, in a home, an office (e.g., business location), or may be a mobile unit (e.g., personal digital assistant). The network 13 may be any real or virtual network that has facilities to store and retrieve data (e.g., archiving nodes 15), which preferably includes encodings of voice, images, and other artifacts. Examples of such networks include the existing long-distance phone network (with storage capabilities at selected nodes), an Asynchronous Transfer Mode (ATM) network similarly augmented with storage capability, or any form of a local area network (LAN), wide area network, or metropolitan area network that is similarly equipped. As schematically illustrated in FIG. 1, an archiving node 15 may be linked to one or more network nodes 19, (and may be at the same physical location as a network node 19), and is adapted for communication therewith.

In accordance with the present invention, and as may be understood from the description of FIG. 1, the archival service is universally accessible to users or subscribers. Any user, who is preferably a subscriber to the archiving service (i.e., one who pays to have the service available for a pre-determined time period) and/or a regular customer to the provider of the archiving service (one who pays the provider periodically for services provided, archiving or otherwise) may access the network 13 which provides the archiving service. Preferably, however, the archiving service is also accessible to a user who is not a subscriber or regular customer but wishes to archive information using the archival service (e.g., "pay-per-use"). That is, the archiving service, and concomitantly network 13, is publicly available and not limited to access only by individuals or entities that have some common affiliation with the archiving service provider other than being users of the archiving service (e.g., commonly employed by the network provider). For example, archiving of information on an office/workplace LAN by employees given access to the LAN by the employer would not be considered an archiving service having universal access (even if accessible by employees working at home or off-site independent contractors) since only employees or other individuals/entities associated with the employer have access to the network and any related archiving services. In this example, in order to provide universal access to the private LAN provided by the employer, the network provider (i.e., the employer) must provide means for any individual or entity that does not have an association with the network provider to access and use the network for archiving. Universal access, then, refers to availability of access to the network/archiving service by independent entities. Universal access, however, does not mean that the network/archiving service provider cannot refuse to provide (or limit access to) the network/archiving services to certain individuals/entities (e.g., refusing to "sign on" as a customer, or requesting a pre-payment/subscription plan from, an individual/entity having a bad credit history).

Figure 2:
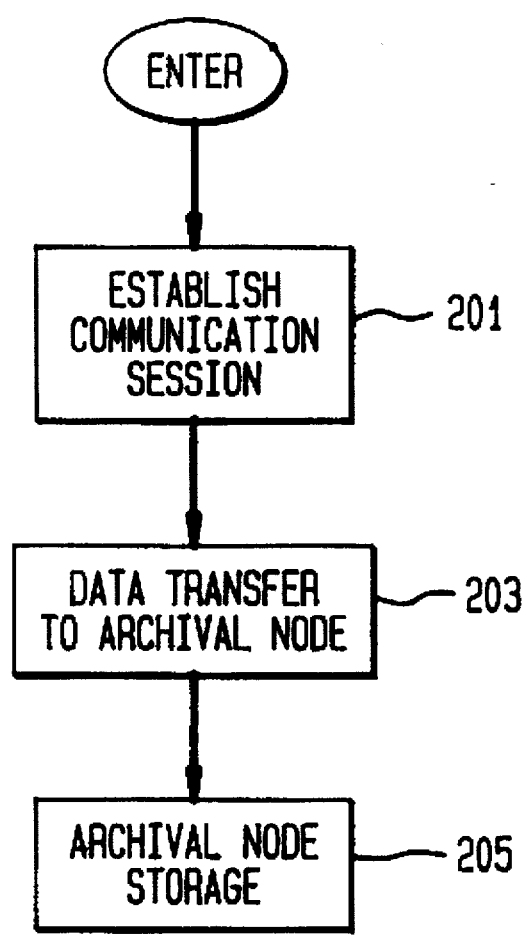
FIG. 2 is an operational flow chart of an exemplary process for implementing network based archiving in accordance with the present invention.

Referring to an operational flow chart illustrated in FIG. 2, an embodiment of the present invention proceeds as follows in accordance with the system represented by FIG. 1. In accordance with a method of the present invention, access to archival services (i.e., establishing a connection for an archiving session, step 201) is achieved by a combination of an access mode and an access protocol (the combination referred to schematically as including network access means 17 of FIG. 1). FIG. 1 schematically illustrates that a connection between the customer premises 11 and the archiving services of the network 13 provides access to the network 13 at an initial point or node of the network, the location of which depends on any one of many factors, including one or more of the following: the access mode, the location of customer premises 11, and the network architecture. For example, an initial point on the network may be a network node that is directly connected to an archiving node or a network node that is connected to an archiving node via additional network components (e.g., additional network nodes).

An access mode refers to any signal communications means that provides a connection between the backbone network 13 and the customer's equipment. This access mode may, for example, include any of the following means: a regular phone line with a modem; a television "set-top" box that embodies such capabilities; high-speed connections into either the phone or backbone network, or wireless modes of accessing the backbone or server network. Such access may be done either directly or indirectly (i.e., by using some intermediate networks or modes that eventually enable access to the intended backbone network). Generally, any access mode through which any one of a plurality of users may communicate with the network is referred to as the communication link between the users and the network. As described above, the communication link provides for universal access of the network/archiving service.

For any given access mode, an access protocol refers to any method and associated signaling protocol by which a connection is established between a user and the network in order to access or provide the archival services. As an example, a user may dial a special access number (e.g., an 800 number) which would provide access to the network service. The identity of the user can then be established by "logging in" to the network using a user identification code (login ID) and/or by providing a user-specific "personal identification number" (PIN) that may also be used for billing purposes. For an information processing device that is exclusively associated with a particular subscriber (and preferably, includes a local level of security to prevent unauthorized use thereof), the "logging in" procedure may occur without user intervention such that a device identification code, or the equivalent of an automatic number identification code (ANI) is transmitted to the network to identify the device. Generally, however, access to the network-based archiving service is preferably based on user identification, since most users prefer access to such a service regardless of the information processing device being used; also, billing is generally performed on a user basis rather than on an information processing device basis. Nevertheless, even where "logging in" is based on user identification, it may still be preferable to also provide device identification information for purposes of maintaining an archive connection list (e.g., a list including date, time, device, file archived) in the network that may be accessed by a user to review a list of files archived to the network from various devices.

After a connection is established over the communication link according to an access mode and access protocol, the actual data transfer (step 203) can then be done using standard data transfer techniques that are well known to those skilled in the art. In addition, an encryption methodology (e.g., National Security Agency Data Encryption Standard) may be employed during data transfer to provide security. As known to one skilled in the art, encryption may require additional hardware (e.g., an "encryption chip") for efficient implementation of encryption methods. The transferred data can be ASCII (stored compressed in the standard fashion), or a combination of ASCII/data files along with other media such as voice, images/video etc. Generally, it is not necessary for the network to be informed by the accessing device as to what type of data is being transferred; however, as will be further understood hereinbelow, providing the network with this information as part of the data transfer format and protocol may be preferable for the network to implement additional features such as data compression or data format conversion, and/or for billing purposes. The data transferred to the network is archived on a storage device at a network information archiving node 15 (step 205).

In addition to those mentioned, one may appreciate that there are myriad features and options for information archiving that may further be provided to users of a network-based archiving system according to the present invention. These features and options may also be used for billing purposes in order to apportion cost to subscribers based on relative use of the archiving service resources. By way of example, some features and options for information archiving include: the degree of protection from loss, the length of storage, and the degree of compression.

A user may wish to select the degree of protection from loss for archived information, and the network-based archiving system may then store the information accordingly (e.g., at multiple locations). Existing communications networks are already designed to be fault tolerant along several dimensions. That is, they incorporate several features to guard against machine crashes and man-made as well as natural disasters such as cable breaks and fire. Thus, one skilled in the art may readily implement different degrees of protection on current networks. In addition, a user may wish to select the desired length of storage for all or each type of stored information.

Any compression that does not introduce information loss is completely transparent to the user and can be used by the underlying system. In addition, there may be some degree of information loss that is tolerable, or even desirable, to the user in certain cases. For instance, video images may be compressed significantly by storing only representative frames of scenes when they change, optionally annotated with text/hypertext. In cases where compression is information lossy, but there is only a gradual degradation in the information archived, the cost of storage can be designed as a function of the compressed data stored.

It may be appreciated that the hereinabove access protocol may be initiated either by the customer premises 11 ("customer initiated access mode") or by the network 13 ("network initiated access mode"). For instance, at the time the archiving service is provisioned, or at any subsequent time (e.g., via a customer service representative or by on-line commands to the archiving service), the user may enable the network initiated access mode by requesting that the network be the initiating device for establishing a connection with the user's equipment (e.g., by "dialing-up" the user's personal access number to reach a fax or phone that is connected to a storage device, e.g., via a personal computer), and initiate a transfer that is based on a prearranged (or even dynamically determined) access code and details of what is to be transferred (e.g., data that has been modified since the last archive, data in a particular file, etc.). The user may specify the frequency and/or time that the communication will be initiated by the network (e.g., once each day, once each day after normal business hours, etc.). The customer initiated access mode is directly available to the customer and preferably may also include an automatic (i.e., without direct user initiation) customer initiated access feature, wherein the customer equipment automatically initiates access of the archiving service upon the occurrence of a predetermined event. By way of example of an automatic customer initiated access mode and of a network initiated access mode, a local area network communications server at a customer premises 11, either in response to inquiry from the network 13 archiving system or upon its own initiation based on a predetermined condition (e.g., quantity of new information stored on local area network, time elapsed since previous information transfer), may communicate information to the telecommunications network for archiving.

Figure 3:
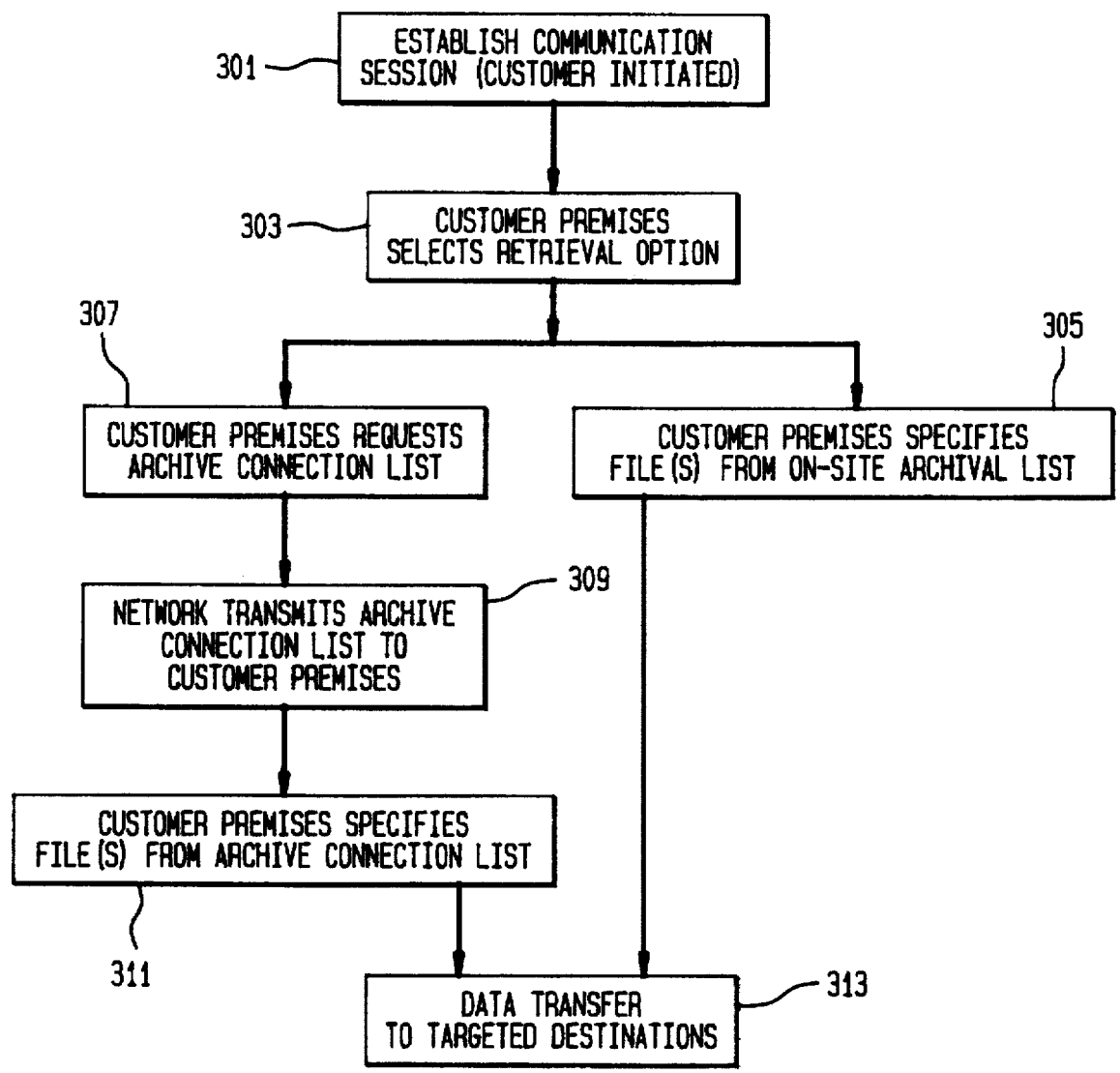
FIG. 3 is an operational flow chart of an exemplary process for implementing information retrieval in accordance with the present invention.

Referring to the operational flow shown in FIG. 3, data retrieval at a later time can be done by accessing the archival service (step 301) in a similar manner (e.g., via a modem) as subscriber accessing of the archival service for data archiving (e.g., dialing a 800 number and logging on), and then following a retrieval protocol to retrieve the data from the network and transfer it to the customer equipment (e.g., personal computer) that initiates the access and/or to another device at the same customer premises 13 and/or to a device at a location different from the customer premises 13. For instance, such a retrieval protocol may include downloading a file requested by the user according to the user's own record of archived files (e.g., on-site archival list) (steps 303,305,313). Such a retrieval protocol may include transmitting an archive connection list from the network to the user, who then may select one or more archived files for downloading from the network to one or more devices (steps 303, 307, 309, 313). Furthermore, it may be appreciated that a selected device may require a different data format, and that the network may first convert the archived information to the proper format prior to transmission to the designated target device. For instance, where the target device is a facsimile machine, but the stored information is in ASCII, an appropriate data conversion may be performed upon retrieval from the network-based archiving system storage device and prior to transmission to the target device. Knowledge by the network of any required data format conversion may be provided by any one of the following sources: the user that initiates access, information stored in the network for any subscribing device, the target device upon establishment of a connection with and by the network. Preferably, the initiating user determines which of these three options to employ (e.g., for a target device, the network may store a default data format which may be overridden by the initiating user).

As mentioned above, preferably, each device maintains an on-site (e.g., within the device itself, or a storage means accessible by the device independent of the network) archival list of files that are archived on the network. Access to the on-site archival list and/or to specific entries on the on-site archival list may further be limited by a local security protocol according to user specific security designations (e.g., "public", or "private" for a user or group of users, or "semiprivate", etc.). As a further example of a local security protocol for machines (e.g., PCs) connected in a local area network wherein a user may log into the local area network from any machine, the archive access protocol may only provide a given user with an on-site archival list of files associated with the given user. In this way, when access to the archival system is via a customer initiated access mode, it is not necessary for the network 13 to transfer an archival connection list to the customer unless the customer wishes to access archived files that were transferred to the network archiving system from customer premises not associated with the current customer premises (and hence, not associated with the current on-site archival list). Another option that may be available to the user, regardless of whether an on-site archival list or an archival connection list is employed, is to perform data indexed searching (e.g., keywords, subject, etc.) for information/files that were archived by the user.

It may be understood that in view of the present invention, there are many possible specific implementations of user interfaces for retrieving data from (as well as transferring data to) the network archiving system, and that some of the options and related functions required by respective network 13 systems (e.g., network node communications server, archiving node communications server, etc.) and customer premises 11 equipment (e.g., software interface) are provided as an example thereof, and which may be implemented by one skilled in the art.

In view of the foregoing detailed description, it may be appreciated, therefore, that the method and system of the present invention provides a service on a network that enables a user at home (alternatively in an office/small business/large business etc.), or even a roving user on the road or in the air, to archive information on demand. A hook up into the network may be accomplished in any one of several ways, and an initial protocol accesses the archiving service and communicates details of what is to be archived. The communication medium is then used to transmit and store the information in a specified fashion, to be retrieved at a future time. Further, the above protocol may either be under explicit control of the user, or be provided by a customized (e.g., dependent on user specific information stored in a customer profile on the network) archiving program that interrogates the user's system and incrementally stores modified data (and/or data in a specific file) during "off-peak" times in the network, or both. As a further embodiment of user controlled protocol (i.e., user initiated access), an archiving program may run in the background of a user's system, and initiate a communication with the network under predetermined conditions (e.g., periodically, or based on the amount of information accumulated since the previous archiving session, etc.). Remote/wireless access to the network may also be provided. For example, a scenario where this access is particularly useful occurs when local memory is nearly full in a personal digital assistant (PDA): the RAM/ROM store can be archived remotely, thus allowing for continued functioning of the device even though a spare RAM card, etc. is not locally available to the PDA.

One skilled in the art recognizes that the present invention is not limited to the system shown in FIG. 1, which is merely illustrative, and is susceptible to many modifications and adaptations. As an example of another embodiment of the present invention, shown in FIG. 4, in simplified form, is exemplary telephone network 100 which may be adapted to implement the principles of the present invention. Telephone network 100 comprises stationary customer premises stations 102, 104, 114, and 116 (e.g., fixed business or home location), mobile customer premises 103 and 105, local exchange carrier (LEC) networks 106, 108, 110 and 112, wireless nodes 115, 117, and 119 (e.g., cellular base stations), and long distance network 118, illustratively the AT&T network. Customer premises stations 102, 103, 104, 105, 114 and 116, are representative of a plurality of network endpoints, the remainder of which are not shown for clarity of exposition.

LEC networks 106, 108, 110 and 112 contain switching machines (e.g., toll switches "TSs") 120, 122, 124, 126, respectively, each switching machine capable of connecting a plurality of network endpoints to long distance network 118. Such switching machines are well known and may be, for example, an AT&T 5ESS® switch. These switches are stored-program control switches which contain the service logic required to intercept calls which require special handling by the network, and to send queries to the network. Long distance network 118 comprises switching machines 128 and 130, network control point (NCP) 132 and, in accordance with the invention, archiving node (AN) 136. NCP 132 is of a type well known in the art. Switching machines employed in communications networks are well known. Switching machines 128 and 130 are illustratively AT&T's No. 4ESS™ switch. In addition, it is understood by one skilled in the art that the long distance network 118 includes a network of such switches, network control points, and archiving nodes, in addition to other elements which are not depicted in FIG. 1.

Switching machines 128 and 130, NCP 132, and AN 136 are interconnected in the manner shown by signaling network 138, represented by dashed lines. Customer premises stations 102, 104, 114 and 116, wireless node stations 115, 117 and 119, switching machines 120, 122, 124, 126, and switching machines 128 and 130, and AN 136 are interconnected by information links 140, in the manner shown. Information links 140 are of the well known types in the art for interconnecting communicating apparatus and can carry at least voice, data, and video. Each of information links 140 need not have the same capacity. A typical implementation would comprise a mix of conventionally known digital transmission links, e.g., DS0, DS1 and DS3, provisioned in accordance with the needs of the network providers. Communication between mobile customer premises 103, 105 and the telephone network 100 is well known in the art (e.g., time division multiple access (TDMA), code division multiple access (CDMA), etc.), including, for example, the design and implementation of wireless node stations 115, 117, 119 (e.g., cellular base stations) and other system components (not shown in detail) for interfacing to the telephone network 100. Operation and programming of the network elements shown in FIG. 4 in order to implement network services are well known to one skilled in the art.

Preferably, in such a telephone network, the archiving service is offered as a subscription feature. As described in connection with the foregoing embodiment, there are alternatives for providing access to the archiving service. Preferably, a special access number (e.g., one or more 800 numbers) is assigned to the archiving service, and a user who subscribes to the service may associate a particular number with the customer premises. This number could be, for example, a plain old telephone service (POTS) number, a normal cellular number, etc. Alternatively, each user may be assigned a particular special access number (e.g., an 800/900 number). In addition, each subscriber may further be associated with a login ID, password, or PIN, etc. Preferably, the network 118 stores this customer information in a database.

Figure 4:
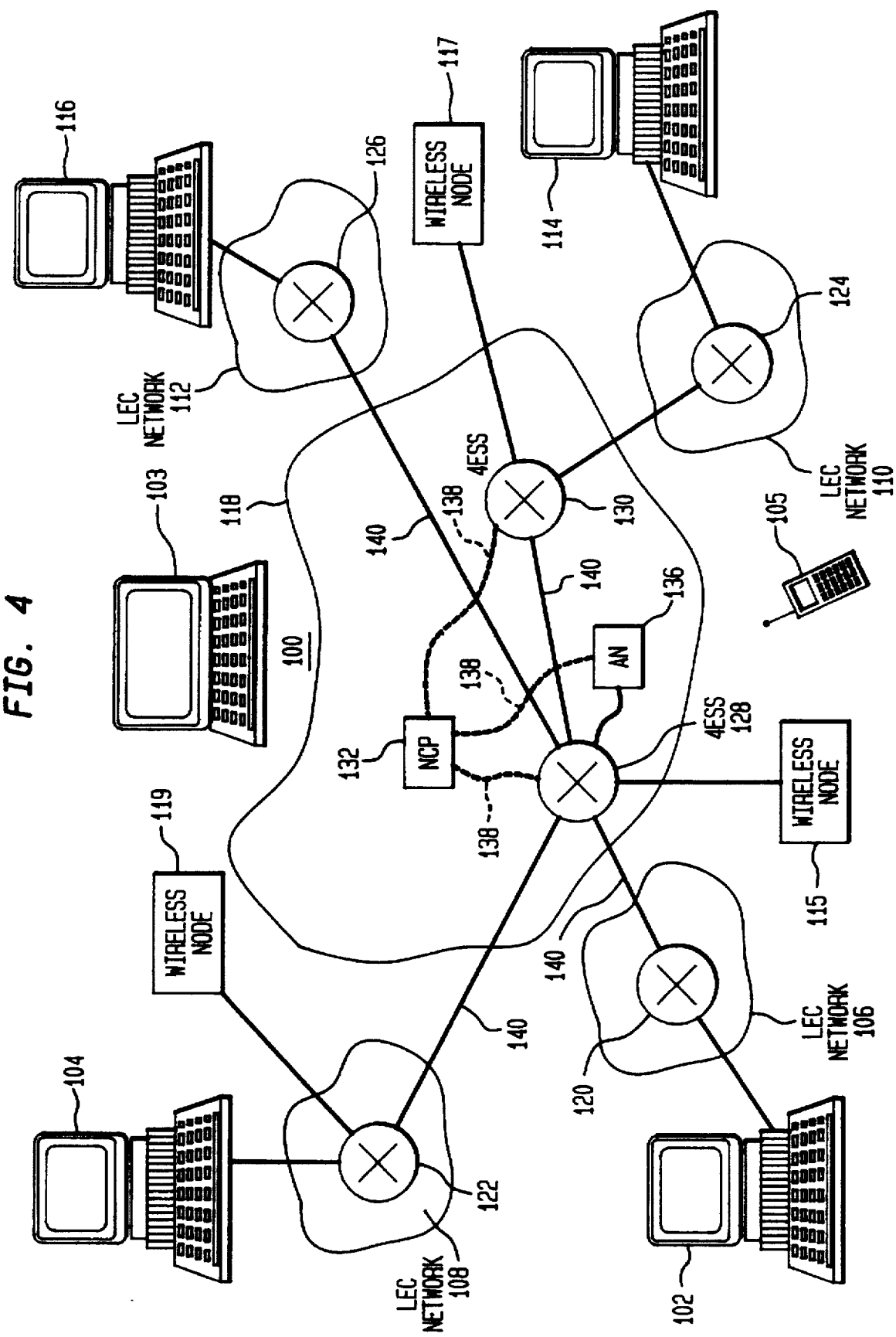
FIG. 4 depicts, in simplified form, an exemplary telephone network embodying the principles of the present invention.
Figure 5:
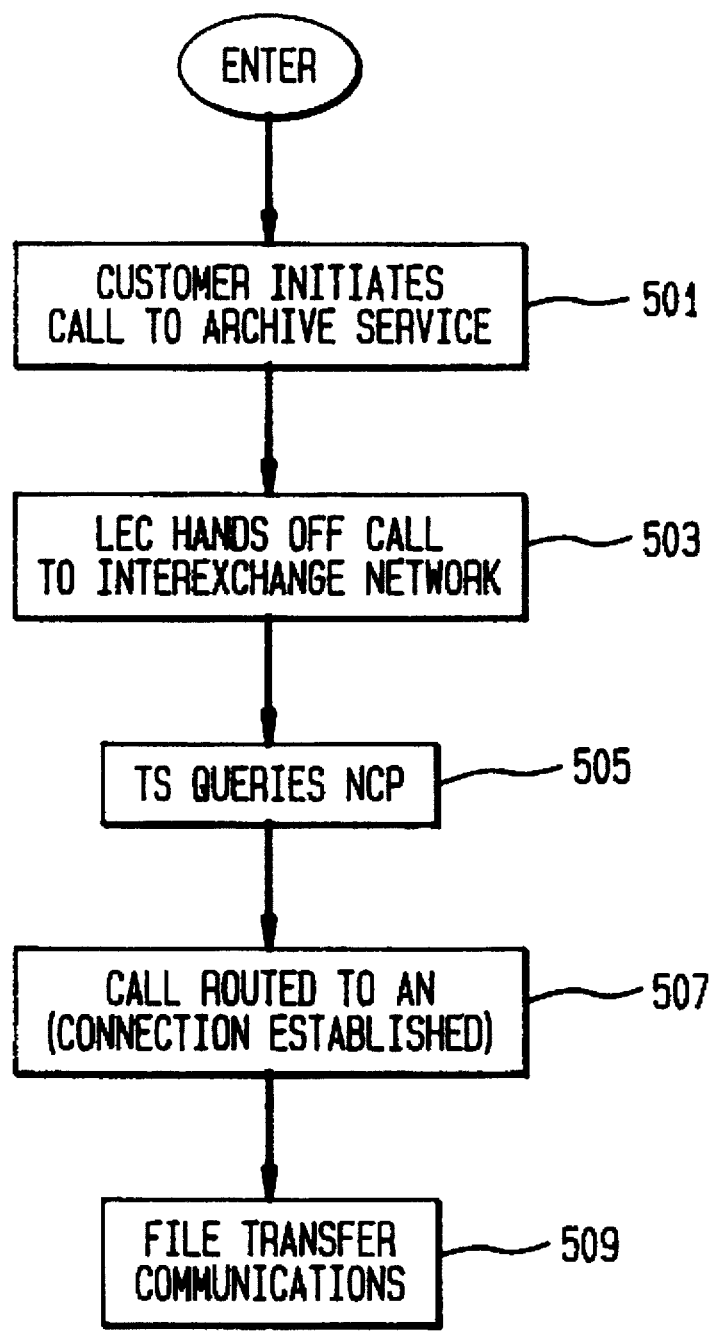
FIG. 5 is an operational flow chart of an exemplary process for implementing a customer-initiated network based archiving session according to the exemplary telephone network of FIG. 4, in accordance with the present invention.

Referring to the operational flow chart illustrated in FIG. 5, an embodiment of the present invention proceeds as follows in accordance with the telephone network represented by FIG. 4. In step 501, a customer premises (for purposes of example, customer premises 102) places a call to the archiving service by dialing a special access number (e.g., an 800 or 900 number). Typically more than one number is available for accessing the archiving service.

Based on the number dialed, LEC 106 (i.e., TS 120) recognizes the call as one for special handling and routes the call to network TS 128 using either in-band or out-of-band signaling, providing the dialed special access number to the network (step 503), and preferably also the caller automatic number identification (ANI).

Upon receiving the call, in step 505, TS 128 launches a query to NCP 132, providing the ANI and dialed 800 number. Based on this information, the NCP instructs the TS 128 to route the call to AN 136 (step 507). It is also possible that NCP 132, in response to the initial query from TS 128, routes the call to a different TS (e.g., TS 130) for connection to a different archiving node based on various conditions, such as the dialed 800 number, the caller ANI, the load at AN 136, etc. Furthermore, in routing the call, NCP 132 may also communicate any additional information (e.g., subscriber ANI) to AN 136 that may be used by AN 136 for improved service. For instance, the subscriber ANI may be used by AN 136 to begin retrieving customer specific information (e.g., a customer profile) that may be required for (e.g., login password), or may assist customer service in, the ensuing archival service session.

It is understood that different 800 numbers may be assigned for customer access of the archiving service for archival storage and archival retrieval, respectively. This partitioning permits direct entry into the appropriate archival service immediately upon establishing a connection between a subscriber and an archival node. Nevertheless, for purposes of ease of use for subscribers, it may be preferable not to provide distinct special access numbers for storage and retrieval; instead, once a connection is established between the customer premises and the AN, whether the storing resources or the retrieving resources will be accessed (or both) is determined according to information communicated therebetween.

Once a connection is established between the customer premises 102 and the AN 136, further communication therebetween occurs to effect transfer of one or more files (step 509): from the customer premises to AN 136 for archiving on the network (i.e., file storage); or from AN 136 to the customer premises 102 (i.e., file retrieval). This communication occurs in response to applications and features of the user interface (e.g., software features and options available to the customer premises 102) and the AN 136 (e.g., software and applications provided by the AN 136). For instance, the subscriber may: request retrieval of a specific file from an on-site archival list; peruse (and retrieve a file from) an archival connection list maintained by the network (e.g., in order to further access files previously archived by the user while at different customer premises); archive specified files; archive any previously archived file that has changed since the previous archiving session, etc. These options are illustrative of the many features that may be provided by one skilled in the art in order to furnish an archiving system and method of the present invention with a user friendly and efficient archiving service.

Figure 6:
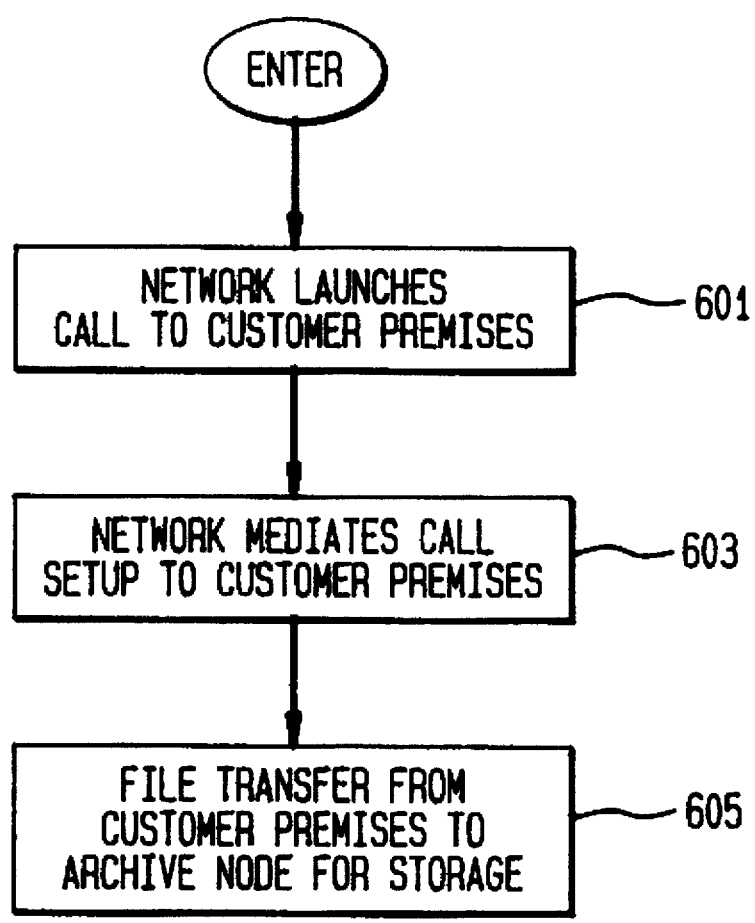
FIG. 6 is an operational flow chart of an exemplary process for implementing network-initiated network based archiving session according to the exemplary telephone network of FIG. 4, in accordance with the present invention.

Referring to FIG. 6, as described in connection with the operational flow of FIG. 2 for the generic network of FIG. 1, a preferred feature of the archiving system and method of the present invention is a network initiated access mode, that may be selectively enabled by the subscriber, for archiving files on the network. Accordingly, if this mode is enabled and a predetermined event occurs, AN 136 launches a call to the appropriate customer premises (e.g., customer premises 114), the call routing being mediated by NCP 132, TS 128, TS 130, and TS 124 (steps 601, 603). Upon establishing a connection, archiving of files (step 605) occurs according to the telephone network 100 format/protocol, in a manner as described for FIG. 1 (e.g., update all changed archived files, archive files specified by customer equipment, etc.). Any blocking or transmission errors that prevent the connection from being established are handled in the usual way, with AN 136 receiving a signal indicative of the failure to complete a connection.

Figure 7:
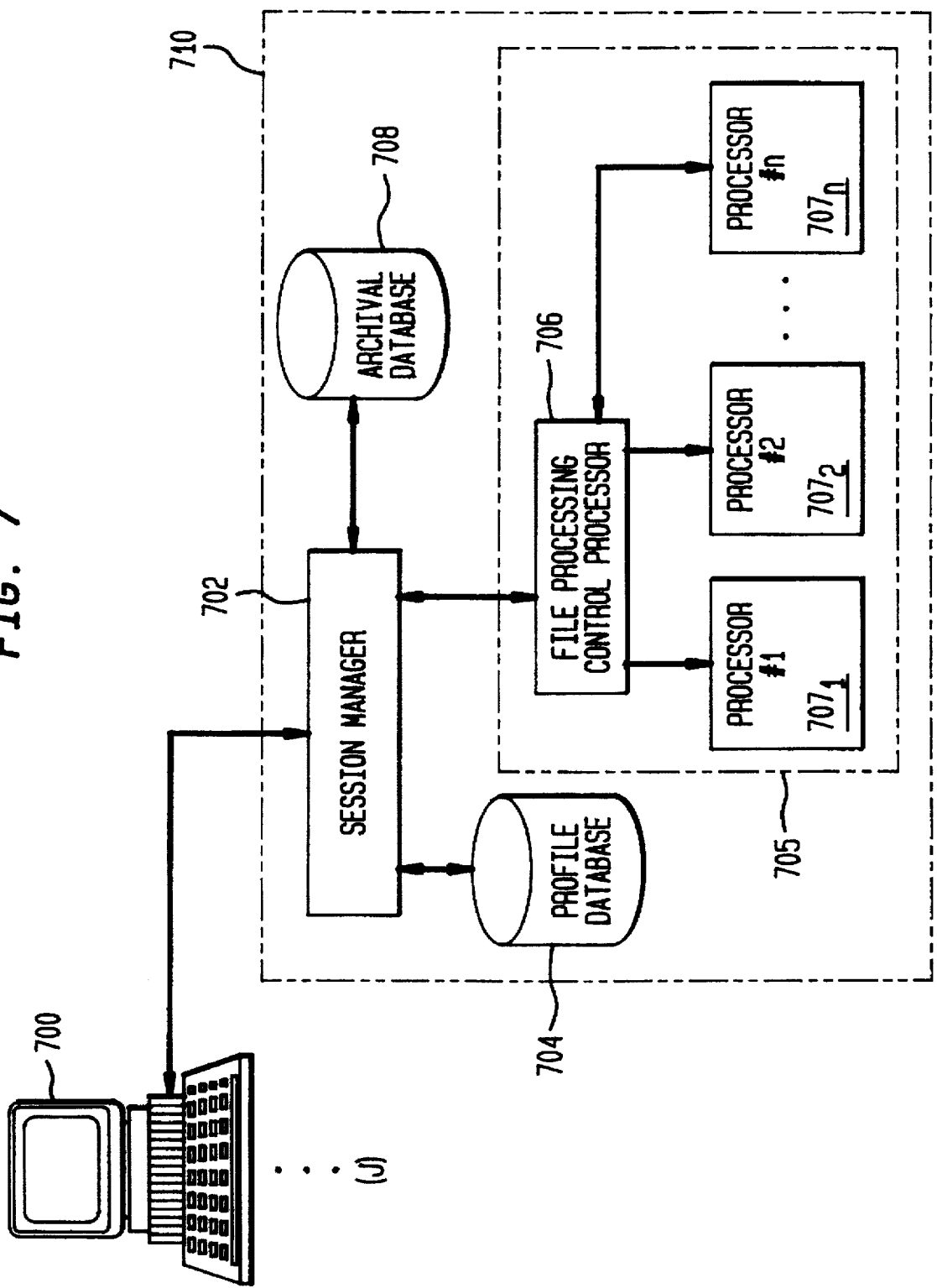
FIG. 7 depicts, in simplified form, an exemplary archival node, according to the present invention.

Referring now to FIG. 7, there is shown an embodiment of an archiving node 710 (e.g., AN 136 or archiving node 15) in accordance with practicing the present invention, and which may be adapted for use with the foregoing, and other, embodiments of the invention. As previously described, the present invention is not limited to any particular network, but may be employed in accordance with a private/premises-based network, or a public network such as a public switched telecommunications network (PSTN). Such a system may be implemented as either a one-node or a multi-node distributed architecture, scalable as required. In a multi-node distributed architecture, preferably a plurality of archiving nodes, each which supports the archiving service communications protocol, would access a centralized database, while servers providing additional features (e.g., file conversion, compression, etc.) preferably would be located at each node and be accessible to other nodes via a gateway or bridge. (A particularly useful feature for such an archiving service is software translation, since retrieved information that has been archived for a reasonably lengthy period of time may preferably require translation to provide compatibility with changes that have occurred in the software with which the information is used). If the network were to represent the AT&T interexchange network, for example, in addition to other possible network elements that are known to one skilled in the art, such a node may be implemented in accordance with one or more of the following elements (e.g., see FIG. 4): an adjunct processor (AP) (e.g., a network services complex "NSCx"), a network switch (e.g., 4 ESS or 5 ESS), and a service control point (SCP) (e.g., a network control point "NCP"). Such elements are well known in the art, as is their adaptation for implementing functions and services. As understood by one skilled in the art, overall system requirements will affect the preferred physical implementation of a network-based archiving system, and there are many variations and adaptations within the purview of the present invention. The archiving node 710 shown in FIG. 7 is merely illustrative of a node that may be used with such networks.

Referring to FIG. 7, at an archiving node 710, which is preferably associated with a network node, a number of discrete servers are networked on a data link such as an Ethernet or FDDI (i.e., fiber distributed data interface) bus. As schematically depicted, more than one customer premises device 700 may access the network by any of a variety of means, including switched access (e.g., using an 800 number or other special access code) or direct-network connection, and the network may connect to any customer premises device by any of a similar variety of means. It is understood that the servers, schematically depicted in FIG. 7, generally comprise one or more physical devices having hardware and/or software to accomplish the herein described functions. In a most basic implementation, a single network node includes all servers; more generally, the servers may be distributed as determined by existing or desired system architecture, desired system performance, etc. Preferably, each of the servers include the following respective functions.

The session manager server 702 provides for input queuing of customer initiated archiving session requests, and for login and password management of the incoming requests. Similarly, the session manager server 702 queues outgoing, network initiated requests (i.e., network initiated access mode). The session manager server 702 also queues any incoming file(s) that require additional processing (e.g., compression) prior to archiving or prior to transmission to a target customer premises. As an example of the types of hardware and software that may be supported to implement these functions, the session manager server 702 preferably includes modem banks, e-mail support software, memory storage devices, one or more programmable computers or workstations, programmable switches, etc. The session manager also preferably includes audio response units which receive multifrequency tone (e.g., DTMF) entries from the customer premises, and issues voice messages that elicit these tone responses.

The database server 704 provides a platform for the subscriber database. This database preferably contains a subscriber profile for each subscriber, the elements of which describe for example, the file formats and protocols that can be accepted by the subscriber as well as the subscriber's preferred file format and protocol, any PINs or access codes, user specified parameters for the network initiated access mode, and an archival connection list. In addition, this database may contain the archived information for each user. Alternatively, a separate (preferably centralized) database server 708 may be provided for exclusive archival storage of subscriber files, and the database server 704 may contain only subscriber profile information. Preferably, the database server 704 maintains and manages a list of customer premises that have enabled the network initiated access mode, whereby at the appropriate time a signal (e.g., interrupt request) is communicated to the session manager 702 to initiate an outgoing call to a particular customer premises for establishing an archiving session.

The file processing server 705 performs any data processing (e.g., compression) that may be requested by the user upon archiving or upon retrieval, or that may be required (e.g., conversion) in order to transmit retrieved information to a target customer premises or to archive information (e.g., lossless compression). This file processing server 705 preferably includes file processing control processor 706 and one or more processors (e.g., servers) $707_1, 707_2 \ldots 707_a$. The file processing control processor 706 interfaces with the session manager 702, and controls file routing to and from the processors $707_1, 707_2 \ldots 707_a$ for effecting file conversion, compression, etc. Such applications may be provided by commercial application programs executed by the servers, or special purpose application software and hardware may be developed as necessary. As can be appreciated by one skilled in the art, the nodal service permits a large library of processing functions to be maintained and shared economically by many users.

The archiving node 710 also preferably includes a gateway/bridge (not shown) for connection to other nodes which also provide network-based archiving. Such gateways provide for load distribution and balancing, but also for some specialized processing services, such as degree of protection from loss by storage at multiple archiving node locations. The gateways may also connect to external systems.

The present invention, and the foregoing archiving node elements and their related functions, may be better understood in connection with the ensuing description of the signaling associated with the archiving node 710 of FIG. 7 when an operational flow such as those described for the foregoing embodiments is practiced in accordance with network-based archiving of the present invention. More specifically, with reference to FIG. 7, hereinbelow is described the signaling which occurs in an archiving node when a customer premises 700 initiates an archiving session via a phone call to the network. Such a call may be initiated via in-band or out-of-band signaling, and is muted to the archiving node 710 (e.g., a network node). Also, it is understood that the customer initiated access may occur automatically (i.e., without a person placing the call) when the customer equipment desires file archiving (e.g., of all new files or changed archived files). Upon receiving the call, session manager 702 accesses the profile database 704 to ascertain whether the calling party is a subscriber (e.g., based on the received ANI) and further executes a log-on procedure based on, for example, a user PIN. It may be understood that the PIN information may be received upon initial call setup, or in response to a specific request by the session manager after ascertaining that the ANI is associated with a subscriber. In any event, if the calling party is a subscriber and transmits a valid user PIN, then the session manager establishes a session, retrieving the user's profile from the profile database server 704, and awaits further transmission from the customer premises 700. As understood from the hereinabove detailed disclosure, generally, the customer premises 700 will either request file retrieval from the archiving system, or request file storage to archiving system. For each of these basic options, there are generally different features and options for performing the desired function, and the specific user interface will dictate the specific sequence of events. It is understood that the customer equipment or the archiving node, or both, may be involved in presenting a user interface to the customer.

If the user requests file archiving, then upon receipt of such a file, the session manager 702 first performs any default processing that is specified in the user's profile for the type of information to be archived (e.g., the user may specify that all video files should undergo a specific type of compression). Alternatively, in connection with receiving a signal requesting file archiving, the session manager 702 may receive a signal indicating that a certain type of file processing should be performed on the file before storage. In any case, in order to effect file processing the session manager 702 attaches and invokes the file processing server 705 accordingly, and upon subsequent receipt of the processed file from the file processing server 705 the session manager 702 stores the processed file onto the archival storage device 708. It is also understood that prior to storage, the lossless compression may be performed regardless of the type of file or whether compression is specified by the subscriber. After storing the file, the session manager 702 prompts the profile database server 704 to update the subscriber's archival connection list.

If the user requests file retrieval from the archival system, the session manager 702 may receive a specific request for a file, along with a destination. The session manager 702 then: attaches and invokes the archival storage device 708 to retrieve the selected files; if necessary, attaches and invokes the file processing server 705 to perform any required processing (e.g., decompression, format conversion, etc.); and transmits the file to the requesting customer premises or to any customer premises location specified by the user, or both. The session manager 702 knows what conversions to perform based on information in subscriber profiles or information received from the user, or both.

If before receiving a signal that specifies a file to be retrieved, the session manager 702 receives a signal indicating that the archive connection list is desired by the user, then the session manager 702 transmits the archival connection list, (which was previously retrieved by the session manager 702 from the profile database server 704 upon establishing a session), to the user, and awaits further signal requests therefrom.

As previously mentioned, the retrieved file may be sent to one or more target customer premises in addition to, or not including, the customer premises that requests file retrieval. In such an instance, the target devices may not necessarily be subscribers to the archiving service. When a retrieved file is specified to be sent to target customer premises other than the requesting customer premises, and no file format/protocol is specified by the requesting customer premises, preferably session manager 702 queries the profile database 704 to ascertain whether the target customer premises are also subscribers having a profile that indicates any preferred or required file formats, etc. If the target customer premises are also subscribers, then transmission of a file thereto is performed in accordance with the preferred file format and protocol stored in the target customer's profile.

If, however, the target customer premises is not that of a subscriber, then, preferably, a message is communicated back to the requesting customer premises, indicating that no file format/protocol is available for the target device(s). The requesting customer premises may then either provide this information, or command the archiving node to ascertain this information directly from the target customer premises. If information is to be obtained directly from the target user premises, the session manager 702 may then attempt to complete a call to the target customer premises and, for example, via the audio response unit, indicate that a file communication is pending, and inquire whether receipt is desired, and if so, what type of format and protocol is desired for receiving the communication. The session manager 702 then routes the information to the file processing control processor 706 which, in turn, routes the information to an appropriate one of processors $707_1$, $707_2$. $707_a$. The file processing control processor 706 selects an appropriate one of processors $707_1$, $707_2$, ... $707_a$ based on factors such as functionality, as well as availability and load balancing (e.g., queue management). Information that has been convened is then routed to the called device via the file processing control processor 706 and the session manager 702. As a further example of the signaling that may occur when a file is to be transferred to a target user premises without a priori knowledge of the target device, if the session manager detects a facsimile device at the target user premises, the session manager 702 attaches the file processing control processor 706 to perform any necessary format conversions, and then transmits the facsimile formatted file to the target premises.

The foregoing operational flow is demonstrative of the myriad services which may be provided. The signaling that occurs within an archiving node for other features, such as network-based archiving according to a network initiated mode, may readily be understood in view of the foregoing description of the archiving node and the customer initiated access mode for archiving and retrieval. Moreover, it may be appreciated that the described signaling may readily be modified in accordance with different protocols, user interfaces, archiving node architectures, etc. By way of example, for illustrative purposes, a different protocol or user interface that would require adapting the signaling flow, may include using separate access numbers for file storage and file retrieval; or providing that the user transmit, as part of the initial call, information indicating whether file storage or file retrieval is desired, etc.

As may be appreciated, many features and advantages are associated with practicing the present invention. In accordance with the present invention, an easily accessible, cost effective, efficient, and reliable network-based information archiving system and method is provided. Further, this archiving system and method is not necessarily limited by, or dependent on, individual vigilance. A related feature is that a mobile or stationary individual user, a business location, or any information processing device that can access a network offering such an archival service has available an archival means that is reliable, has essentially unlimited capacity, is cross-platform compatible, and is accessible from virtually anywhere. Moreover, such a network-based method and system for archiving features centralized maintenance and upgrading as well as other related performance and maintenance advantages due to centralization and concomitant economies of scale. The present invention, therefore, includes features and applications that provides an essential service that can be viewed as the electronic "information age" analog of public storage areas. In addition, storage of information on the network renders additional network based services (e.g., compression, database management of information, cleanup,etc.) available to a subscriber, and further provide for "information age waste disposal". It may be further be understood, therefore, that premises based costs associated with maintaining and supporting efficient and reliable archival services, as well as related information processing services, may be minimized.

Although the above description provides many specificities, these enabling details should not be construed as limiting the scope of the invention, and it will be readily understood by those persons skilled in the art that the present invention is susceptible to many modifications, adaptations, and equivalent implementations without departing from the spirit and the scope of the invention and without diminishing its attendant advantages. It is therefore intended that the present invention is not limited to the disclosed embodiments but should be defined in accordance with the claims which follow.

I claim:

1. A method for providing an archiving service on a network that is universally accessible with respect to a plurality of users, said method comprising the steps of:

establishing a connection via said network between said archiving service and a user premises to invoke transfer of information from said user premises to said archiving service for archival storage of said information, the archiving service being universally accessible with respect to a plurality of users;

transmitting the information from said user premises to the archiving service via the network;

said archiving service storing said information;

wherein said step of establishing the connection to invoke transfer of said information is capable of being initiated by the user premises at an arbitrary time and by the archiving service; and wherein said storing step includes the capability of storing the information at multiple locations to protect against information loss to a predetermined degree of confidence selected by the user.

2. The method according to claim 1, wherein said step of establishing a connection to invoke transfer of information is initiated by said user premises.

3. The method according to claim 2, wherein said user premises initiates the step of establishing a connection by calling a special access number.

4. The method according to claim 3, wherein said step of establishing a connection is executed when a quantity of information stored on a local storage means associated with said user premises approaches the storage capacity of the local storage means, and wherein said transmitting step includes transmitting at least a portion of the information stored on said local storage means to increase the available capacity for information storage on the local storage means.

5. The method according to claim 1, wherein said step of establishing a connection to invoke transfer of information is initiated by said archiving service.

6. The method according to claim 1, further comprising the steps, after said storing step, of retrieving the information from said archiving service; and transmitting the information to a destination user premises.

7. The method according to claim 6, wherein said destination user premises is the initiating user premises.

8. The method according to claim 6, wherein said destination user premises includes a user premises that is distinct from the initiating user premises.

9. The method according to claim 6, further comprising the step, after the retrieving step and before the transmitting step, of converting the information to be compatible with the destination user premises.

10. The method according to claim 1, further comprising, between said transmitting step and said storing step, the step of compressing said information.

11. The method according to claim 1, wherein said storing step includes storing the information for a predetermined period of time.

12. The method according to claim 1, wherein said network includes a telephone network.

13. A network archival service system for archiving information routed from a user equipment to an archival service provider via a network that is universally accessible with respect to a plurality of users, said system comprising:

a communication link that is selectively enabled to establish a connection between the user equipment and the archival service provider via the network, said communication link including at least one access mode and providing for universal access of said archival service provider with respect to a plurality of users;

an archival node associated with said archival service provider, said archival node adapted to store information transmitted from said user equipment to said archival service provider over the communication link and adapted to selectively initiate a communication with any of said plurality of users for receiving information to be stored; and wherein said archival node is capable of storing the information at multiple locations to protect against information loss to a predetermined degree of confidence selected by the user.

14. The network archival system according to claim 13, wherein said communication link includes a wireless communication access mode.

15. The network archival system according to claim 13, wherein said user equipment is a mobile data processing instrument.

16. The network archival system according to claim 13, wherein said archival node comprises:

a storage medium;

a session controller, coupled to said storage medium, adapted to communicate with the user equipment over said communication link, and adapted to transfer information to, and retrieve information from, the storage medium.

17. The network archival system according to claim 16, wherein said archival node further comprises:

at least one file server, each file server adapted to process information;

a file processing controller coupled to said session controller and to said at least one file server and adapted to control file routing to and from the at least one file server.

18. The network archival system according to claim 17, wherein said at least one file server is adapted to perform file conversion, compression, or software translation of said information.

19. The network archival system according to claim 16, wherein said storage medium includes a first storage medium that stores information transmitted from said user equipment to said network for archival storage, and a second storage medium that stores user profile information.

20. The network archival system according to claim 19, wherein said session controller is adapted to perform a comparison between the characteristics of information retrieved from said storage medium for transmission to a destination user and the user profile information of the destination user, and to selectively invoke said file server via said file processing controller to process the information according to the comparison.

21. The network archival system according to claim 19, wherein said session controller is adapted to selectively invoke said file server via said file processing controller to process the information transmitted from the user equipment according to the user profile information stored for the user associated with the user equipment.

22. An archival service system for storing information routed from a user premises over a network that is universally accessible with respect to a plurality of users, said system comprising:

means for establishing a connection via said network between said archiving service and a user premises to invoke transfer of information from said user premises to said archiving service for archival storage of said information, the archiving service being universally accessible with respect to a plurality of users;

means for transmitting the information from said user premises to the archiving service via the network;

said archiving service having a means for storing said information; and wherein said means for establishing the connection to invoke transfer of said information is capable of being initiated by the user premises at an arbitrary time and by the archiving service; and wherein said means for storing includes the capability of storing the information at multiple locations to protect against information loss to a predetermined degree of confidence selected by the user.

* * * * *